(12) United States Patent
Mildner

(10) Patent No.: US 8,985,680 B2
(45) Date of Patent: Mar. 24, 2015

(54) UNDERBODY FOR A MOTOR VEHICLE

(71) Applicant: GM Global Technology Operations LLC, Detroit, MI (US)

(72) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/864,857

(22) Filed: Apr. 17, 2013

(65) Prior Publication Data

US 2013/0278021 A1    Oct. 24, 2013

(30) Foreign Application Priority Data

Apr. 21, 2012  (DE) .................. 10 2012 008 025

(51) Int. Cl.
  *B62D 21/02*  (2006.01)
  *B62D 25/20*  (2006.01)
  *B62D 25/08*  (2006.01)

(52) U.S. Cl.
  CPC .............. *B62D 25/20* (2013.01); *B62D 25/082* (2013.01); *B62D 25/087* (2013.01)
  USPC ................... 296/204; 296/193.07; 296/209

(58) Field of Classification Search
  USPC .............. 296/203.01, 204, 205, 203.03, 209, 296/193.07, 193.05, 187.08, 187.12
  See application file for complete search history.

(56) References Cited

U.S. PATENT DOCUMENTS

| | | | | |
|---|---|---|---|---|
| 3,243,221 | A * | 3/1966 | Komenda ..................... | 296/204 |
| 4,898,419 | A * | 2/1990 | Kenmochi et al. ............ | 296/204 |
| 5,002,333 | A * | 3/1991 | Kenmochi et al. ............ | 296/204 |
| 5,549,349 | A * | 8/1996 | Corporon et al. ......... | 296/187.12 |
| 5,549,350 | A * | 8/1996 | Akiyama et al. .............. | 296/204 |
| 5,561,902 | A * | 10/1996 | Jacobs et al. ................. | 29/897.2 |
| 5,810,428 | A * | 9/1998 | Maki ........................ | 296/203.02 |
| 5,829,219 | A * | 11/1998 | Sugawara et al. ............ | 52/653.2 |
| 6,540,286 | B2 | 4/2003 | Takemoto et al. | |
| 6,595,581 | B2 * | 7/2003 | Wolkersdorfer et al. ..... | 296/204 |
| 6,604,781 | B2 * | 8/2003 | Uchida ........................ | 296/204 |
| 6,854,791 | B1 * | 2/2005 | Jaggi ........................ | 296/203.01 |
| 6,929,314 | B2 | 8/2005 | Hanyu | |
| 7,014,256 | B2 * | 3/2006 | Kamura et al. .......... | 296/193.07 |
| 7,073,824 | B2 * | 7/2006 | Uhara et al. .................. | 280/834 |
| 7,204,547 | B2 * | 4/2007 | Okana et al. .................. | 296/204 |
| 7,226,121 | B2 * | 6/2007 | Dandekar et al. ............. | 296/204 |
| 7,434,871 | B2 * | 10/2008 | Mizuma et al. .......... | 296/193.07 |
| 7,527,326 | B2 * | 5/2009 | Egawa et al. ............ | 296/193.07 |
| 7,540,559 | B2 * | 6/2009 | Egawa et al. ............ | 296/203.04 |
| 8,052,205 | B2 * | 11/2011 | Matsuyama ............. | 296/193.07 |

(Continued)

FOREIGN PATENT DOCUMENTS

| | | |
|---|---|---|
| DE | 10014837 A1 | 9/2001 |
| WO | 2012010769 A1 | 1/2012 |

OTHER PUBLICATIONS

German Patent Office, German Patent Search Report for Application No. 102012008025.5, dated Jan. 29, 2013.

*Primary Examiner* — Gregory Blankenship

(74) *Attorney, Agent, or Firm* — Ingrassia Fisher & Lorenz, P.C.

(57) ABSTRACT

An underbody for a motor vehicle is provided. The underbody has a ladder frame with side members and cross members. The side members and the cross members bound at least one opening, and each comprises an upper shell and a lower shell. The upper shells are interconnected into an upper ladder and the lower shells into a lower ladder.

11 Claims, 4 Drawing Sheets

(56) References Cited

U.S. PATENT DOCUMENTS

| | | | |
|---|---|---|---|
| 8,128,154 B2 * | 3/2012 | Egawa et al. | 296/187.12 |
| 8,636,093 B2 * | 1/2014 | Sotoyama et al. | 180/69.1 |
| 8,668,248 B2 * | 3/2014 | Ishizono et al. | 296/187.08 |

* cited by examiner

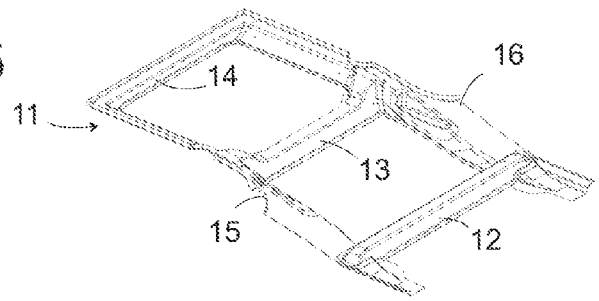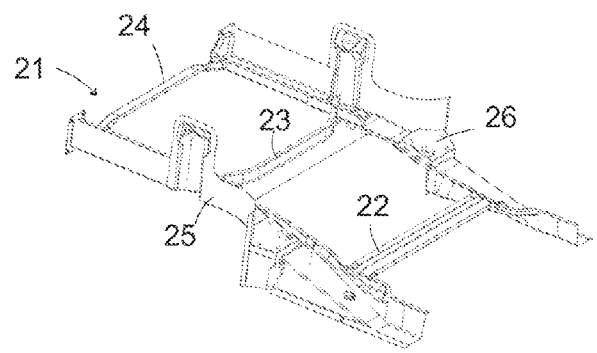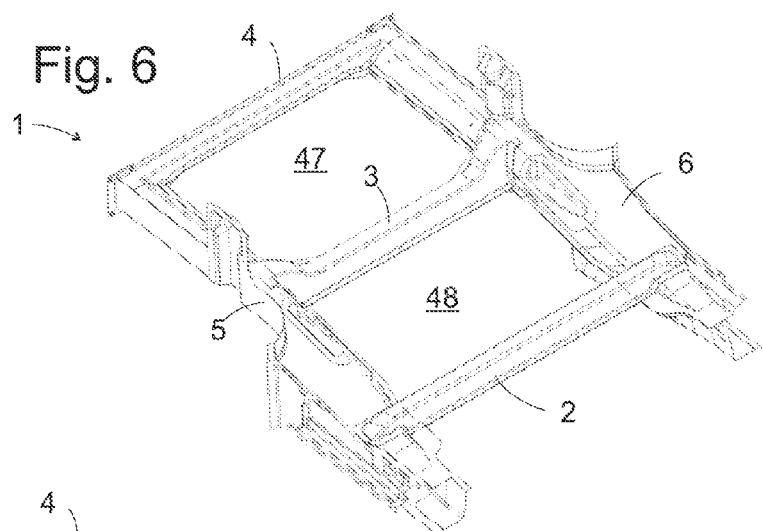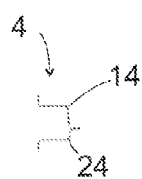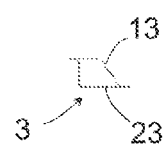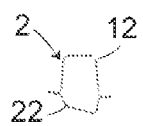

UNDERBODY FOR A MOTOR VEHICLE

CROSS-REFERENCE TO RELATED APPLICATION

This application claims priority to German Patent Application No. DE 10 2012 008 025.5, filed Apr. 21, 2012, which is incorporated herein by reference in its entirety.

TECHNICAL FIELD

The technical field relates to an underbody for a motor vehicle with a ladder structure.

BACKGROUND

Ladder frames as carriers for the paneling of a motor vehicle body have been known for more than 100 years. Modern, self-supporting motor car bodies frequently also have an underbody with side members and cross members, which, even if they merely have to absorb a part of the structural forces that occur on a motor vehicle, can be considered to be a ladder framework. Such an underbody is known from U.S. Pat. No. 6,540,286 B2. It comprises two side members, which extend over the entire length of the vehicle and are interconnected through a plurality of cross members in the form of cylindrical tubes of a constant cross section. Some of these cross members abut lateral flanks of the side members located opposite one another; others laterally protrude over the side members and are therefore fastened resting on these. The small size of the contact area between the side members and cross members touching one another or crossing one another makes it more difficult to produce a connection that can be subjected to a torsional load.

In the case of the cross member abutting the side member, the torsional load capacity depends on the cross sectional dimensions of the latter. A high load capacity requires large dimensions, which in turn however lead to a high weight of the cross member. A high weight in turn leads to a higher fuel consumption.

There is therefore a need for a motor vehicle underbody which achieves a high load capacity with low weight which can be produced rationally at the same time Furthermore, other desirable features and characteristics of the various embodiments will become apparent from the subsequent detailed description and the appended claims, taken in conjunction with the accompanying drawings and this background.

SUMMARY

In an exemplary embodiment, an underbody for a motor vehicle having a ladder framework comprising side members and cross members is provided. The side members and cross members each have an upper shell and a lower shell, wherein the lower shells are interconnected into an upper ladder and the lower shells into a lower ladder. This configuration forms the upper and lower shells of the side members and cross members initially separately from one another, in particular of a flat material. Since the shells do not have any hollow spaces yet, the locations, which have to be interconnected, in order to join the shells into the upper or lower ladder, are easily accessible and allow the use of joining techniques supplying rational and loadable joints. In addition to the fact that in particular the cross members are joined from two shells, the possibility arises that when using extruded cross members, the cross-sectional dimensions of the complete cross members can be modulated over their length and thus the load capacity of the cross members can be adapted to bending loads that can change over their length with minimal use of material.

In an embodiment, under the aspects of the structural calculation and weight optimization, the cross members at their ends acting on the side members have larger cross-sectional dimensions than in a middle region.

Such a modulation of the cross-sectional dimensions can practically be achieved in that an upper flank of the cross member is concavely curved, while a lower flank can substantially run linearly. Thus, the intervention of the cross member into a passenger cell or a loading compartment located above can be minimized.

In an embodiment, the upper shell of at least one of the cross members comprises straps protruding on two ends, each of which is fastened on a top side of one of the side members, and the lower shell of the same cross member can have straps protruding on two ends, each of which is fastened to a lower side of the side members. Owing to the fact that when joining the ladders the upper and the lower shell of this cross member are also joined, a cross member is obtained, whose fastening points have the greatest possible spacing from one another on each side member, so that a highly loadable connection between side members and cross members is obtained.

The connection of side members and cross members can be additionally improved in that on the ends of the upper and lower shells of the cross member, flanges are angled-off, which are fastened on flanks of the side members facing one another.

In another embodiment, a floor panel fills out at least one opening of the ladder frame. If the number of the cross members is large enough in order to form a plurality of openings, each of these can be individually filled out with fitting floor panels. This creates the possibility of combining different models of floor panels on different openings with one another and thus assembling a large multiplicity of model variants of a motor vehicle from a small number of different individual parts.

The upper and lower shells of each cross member adjoining the at least one opening and/or of each side member adjoining the at least one opening, in an embodiment comprise longitudinal flanges on their longitudinal margins which touch one another and are fastened to one another in order to join the upper and lower shells into a hollow cross member or side member.

The longitudinal flanges of the side members and/or cross members joined to one another can practically form a fastening surface projecting into the opening for the floor panel to fill out the opening.

When the longitudinal flanges are present on side members and cross members, these can form a frame extending round about the opening, which makes possible a highly loadable fastening of the floor panel.

In an exemplary embodiment, the longitudinal flanges are arranged at half the height of the side member or cross member, from which they project.

The floor panel (or, in the case of a plurality of openings, the floor panels), can be present in different variants in order to be able to produce different vehicle models. Thus, the floor panel can have a trough that is open towards the top in order to maximize the utilizable volume of a passenger cell or a load compartment above the floor panel.

Such a trough, for example, can be dimensioned and shaped in order to accommodate a spare wheel therein.

In one embodiment, a seat cushion also engages in the trough. Thus, the thickness of the cushion layer can be enlarged, which in particular makes possible comfortable sitting when travelling on an uneven road surface.

Conversely, in another embodiment, the floor panel also comprises a hollow space that is open towards the bottom. Such a hollow space can be utilized in order to accommodate therein a tank outside the passenger cell or a load compartment. The enlargement of the volume for a tank achieved by this is valuable in particular in the case of a vehicle with hybrid drive or a vehicle using a fuel with relatively low energy density such as for example compressed gas.

BRIEF DESCRIPTION OF THE DRAWINGS

The various embodiments will hereinafter be described in conjunction with the following drawing figures, wherein like numerals denote like elements, and:

FIG. 5 is a perspective view of an upper and a lower ladder prior to the joining into a ladder frame in accordance with an exemplary embodiment;

FIG. 6 is a perspective view of a finish-assembled ladder frame in accordance with an exemplary embodiment;

FIG. 7 is a longitudinal section through the ladder frame of FIG. 6;

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
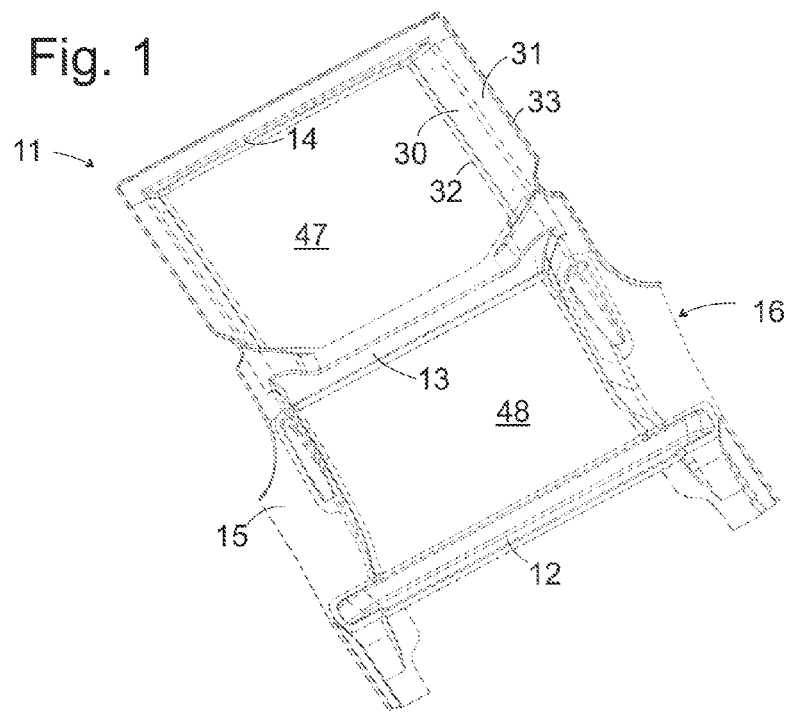
FIG. 1 is a perspective top view of an upper ladder of an underbody according to an exemplary embodiment.

FIG. 1 shows an upper ladder 11 of the underbody according to an exemplary embodiment in a perspective view obliquely from above. Three upper shells 12, 13, 14 of cross members (designated 2, 3 and 4 respectively in FIG. 6) are welded to upper shells 15, 16 of right and left side members (designated 5 and 6 respectively in FIG. 6). The shell 12 in the ready assembled vehicle extends under the front edge of a rear seat row. The shell 13 runs approximately along the border between a passenger cell and a load compartment of the vehicle, and the shell 14 forms a rear termination of the load compartment.

Figure 2:
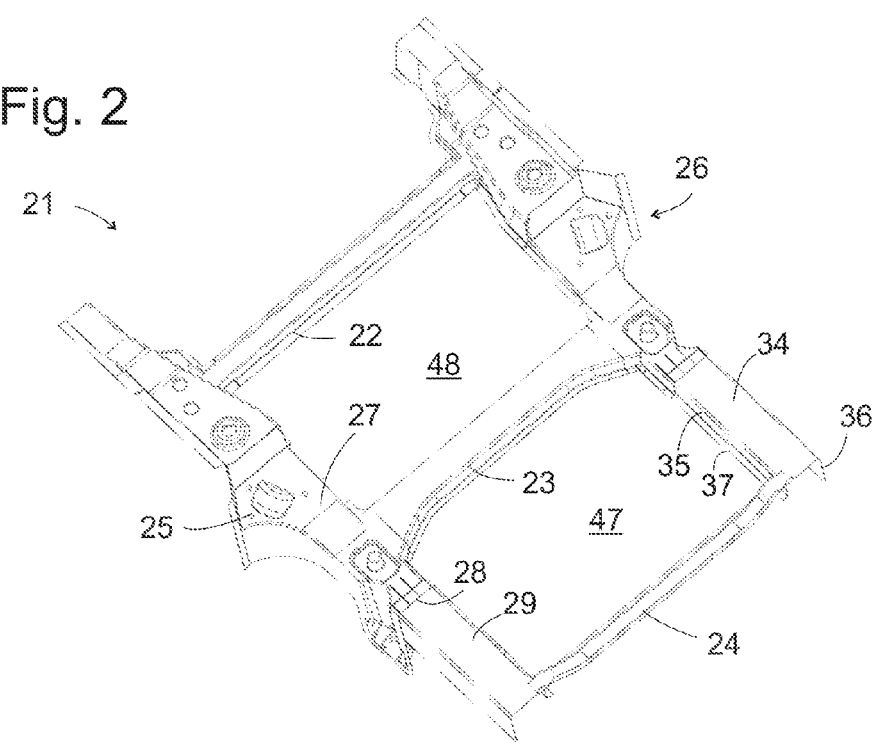
FIG. 2 is a perspective bottom view of a lower ladder of the underbody of FIG. 1.

FIG. 2 shows a lower ladder 21 in a perspective view obliquely from below. In an embodiment, the lower cross member shells 22, 23, 24 are positioned between side member shells 25, 26 so that when joining the ladders 11, 21, an upper and a lower shell 12, 13, 14, 15, 16 and 22, 23, 24, 25, 26 complete one another into a cross member or side member 2, 3, 4, 5 and 6 respectively.

While the upper shells 12 to 16 as well as the lower shells 22, 23, 24 of the cross members are each cut to size from single-layer metal sheets and are formed three dimensionally, for example deep-drawn, the lower shells 25, 26 of the side members are formed in two layers over a part of their length, wherein a lower length 27 ends just behind the middle cross member shell 23 at an edge 28 and a lower layer 29 extends directly as far as to the rear of the vehicle and the shell 24.

As is evident in FIG. 1, the upper shells 15, 16 of the side members 5, 6 each have an L-like cross section with a steep flank 30 facing the vehicle center and a flank 31 which is substantially horizontal in cross section. On the margins of the flanks 30, 31 facing away from one another, narrow longitudinal flanges 32, 33 are angled-off, which are provided in order to be welded to the lower shells 25 and 26 respectively, in order to form complete side members in this way.

The lower shells 25, 26 comprise a horizontal flank 34 each as is evident in particular on their rearward ends in FIG. 2, and inner and outer vertical flanks 35, 36 following thereon on both sides. The inner vertical flanks 35 are approximately half as high as the outer ones 36 and carry a longitudinal flange 37, on which when joining the ladders 11, 21 the longitudinal flange 32 comes to lie. The longitudinal flange 33 then touches an upper margin of the outer vertical flank 38.

Figure 3:
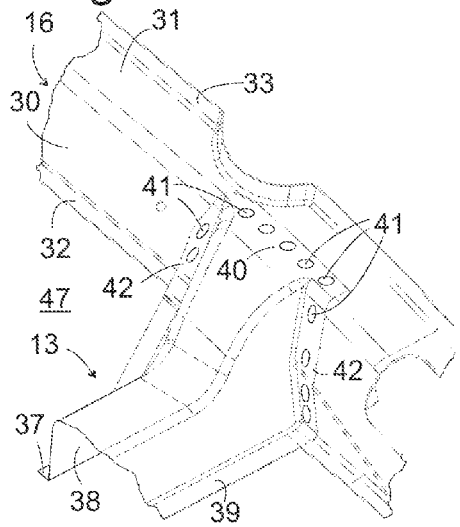
FIG. 3 is a perspective view of a first connection between upper shells of side members and cross members of an underbody according to an exemplary embodiment.

In an enlarged perspective view, FIG. 3 shows parts of the shells 13, 16. In an embodiment, the shell 13 has a hat-shaped cross section with an inverted U-shaped centerpiece 38 and longitudinal flanges 39 adjoining thereon on both sides. While the centerpiece 38 in a central region of the shell 13 is only approximately half as high as the laterally adjoining shell 16, it has been pulled up at its ends so far that a strap 40 protruding on an end of the centerpiece 38 rests on the horizontal flank 31 of the shell 16 where it is fastened for example through spot welds 41. The strap 40 is followed on both sides by flanges 42, which hug the steep flank 30 of the shell 16 where they are likewise spot welded.

Figure 4:
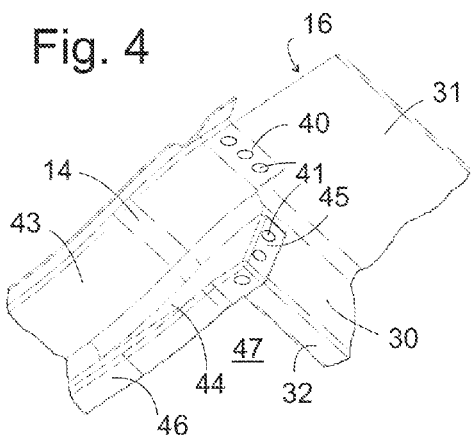
FIG. 4 is a perspective view of a first connection of upper shells of FIG. 3.

A similar construction of the connection between the upper shell 16 of the side member and the upper shell 14 of the rearmost cross member is shown by FIG. 4. Like the shell 16, in an embodiment, the shell 14 also has a substantially L-shaped cross section with a horizontal flank 43, which rises from the center towards the lateral ends of the shell 14 in order to terminate in a strap 40 resting on the horizontal flank 31 to which it is spot welded. A flange 45 angled off a vertical flank 44 of the shell 14 is spot welded to the steep flank 30. A longitudinal flange 46 angled off the flank 44 forms a circumferential frame all round about a rear frame opening 47 with the adjoining longitudinal flanges 32 of the shells 15, 16 and the rear longitudinal flange 39 of the shell 13 located opposite. Accordingly, a front frame opening 48 (see FIG. 1) is closed by the longitudinal flanges 32 of the shells 15, 16, the front longitudinal flange 39 of the shell 13 and a longitudinal flange of the shell 12.

In a manner which is analogous to FIGS. 3 and 4 which is not shown in detail here, the shells 22 to 26 of the lower ladder 21 are interconnected.

FIG. 5 shows the two ladders 11, 21 in the separated state on top of one another. In FIG. 6 the ladders 11, 21 are joined into a complete ladder frame 1 and the longitudinal flanges of the shells 12-16 and 22-26 located opposite one another by pairs are welded together by pairs where they are accessible for welding.

FIG. 7 shows a schematic cross section through the cross members 2, 3, 4 formed in this way. With the two front cross members 2, 3, the shells 12, 22 and 13, 23 respectively complete one another into two hollow profiles; the shells 14, 24 form a U-profile that is open towards the rear, which is only closed in a later assembly step through the attachment of a rear wall of the body.

Figure 8:
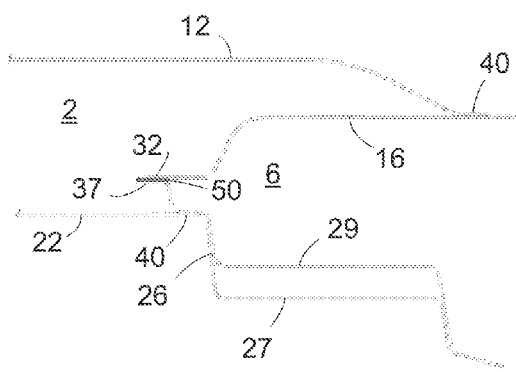
FIG. 8 is a detailed cross sectional view of the ladder frame from FIG. 6 at the height of a front cross member.

FIG. 8 shows a schematic section in vehicle transverse direction through the side member 6 and an end piece of the front cross member 2 fastened thereon. Noticeable is the construction of the lower shell 26 of layers 27, 29. The longitudinal flanges 32 or the upper shell 16 and 37 of the lower shell 26 touching one another are enclosed in the interior of the cross member 2 over a part of their length when the ladders 11, 21 are joined together, where they are not accessible for welding tools. For this reason, in an embodiment, a glued connection is provided between the longitudinal flanges 32, 37 within the cross member 12, the adhesive 50 of which is positioned onto one of the longitudinal flanges 32, 37 prior to the joining of the ladders 11, 21.

Figure 9:
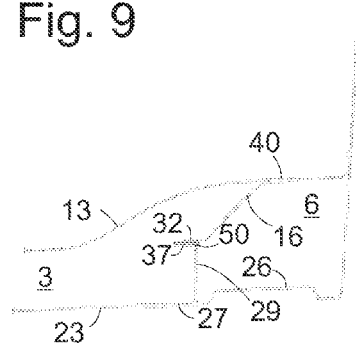
FIG. 9 is a detailed cross sectional view of the ladder frame of FIG. 6 at the height of a middle cross member.

FIG. 9 shows a step which is analogous to FIG. 8 at the height of the middle cross member 3. Here, too, the longitudinal flanges 32, 37 are enclosed between the shells 13, 23 of the cross member and glued together. The double-layer construction of the lower shell 26 in this case also facilitates forming support surfaces, of which one during the assembly of the lower ladder 21 carries the shell 24 and the other one forms the longitudinal flange 37 supporting the upper ladder 1.

Figure 10:
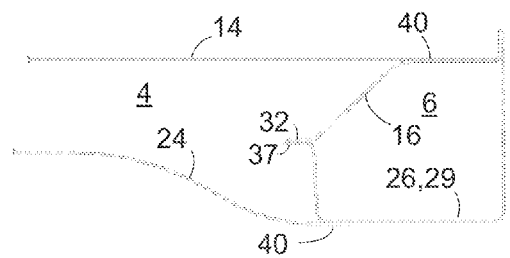
FIG. 10 is a detailed cross sectional view of the ladder frame of FIG. 6 at the height of a rear cross member.

As is explained above with respect to FIG. 2, the lower layer 27 ends between the middle and rear cross member 3, 4 on the edge 28, so that on the rear cross member 4, at the height of the section shown in FIG. 10, the lower shell 26 merely consists of its upper layer 29. In an embodiment, the lower shell 24 of the rear cross member 4 is therefore welded against a horizontal flank of the lower side member shell 26 from below. The connection between the longitudinal flanges 32, 37 can be glued at this point as at the height of the other cross members 2, 3; since the rear cross member 4 is open towards the rear, as shown in FIG. 7, it is also possible here to introduce a welding tool via the open rear end of the cross member and to weld the longitudinal flanges 32, 37.

Figure 11:
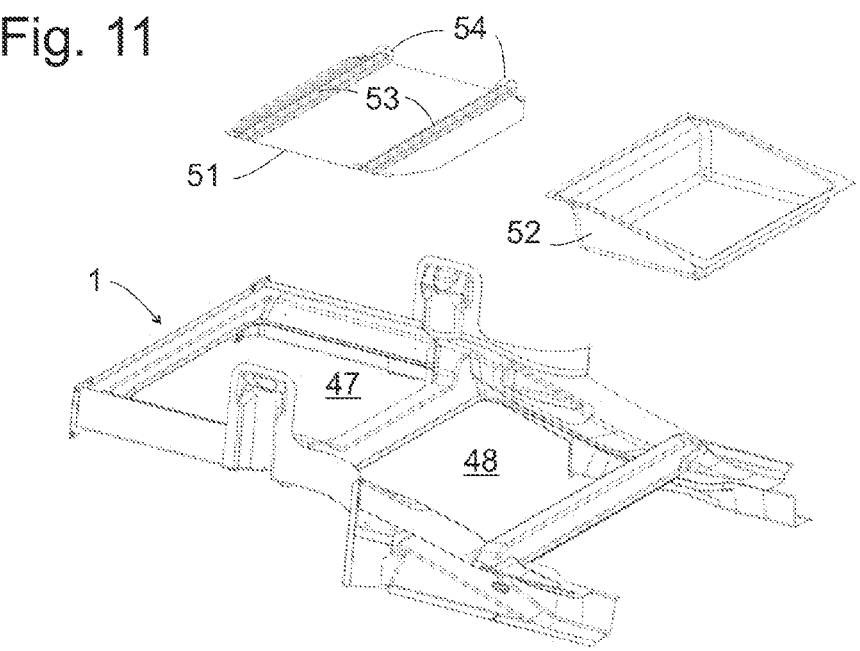
FIG. 11 is the ladder frame of FIG. 6 together with a first set of floor panels.

FIG. 11 shows the ladders 11, 21 connected into the ladder frame 1 and, above the two frame openings 47, 48, two floor panels 51, 52 provided for the assembly in the frame openings 47, 48. The floor panels 51, 52 are each formed and dimensioned in order to come to lie with their circumferential margins on the longitudinal flanges surrounding the frame openings 47, 48 and to be welded to these.

In an embodiment, the rear floor panel 51 is stiffened through two transverse rails 53, which at their ends have screw straps 54 for fastening to the side members 5, 6 and are provided in order to fasten the seats of a third seat row thereto.

The front floor panel 52 depressed in the manner of a tub is provided in order to accommodate cushions of a second seat row.

Figure 12:
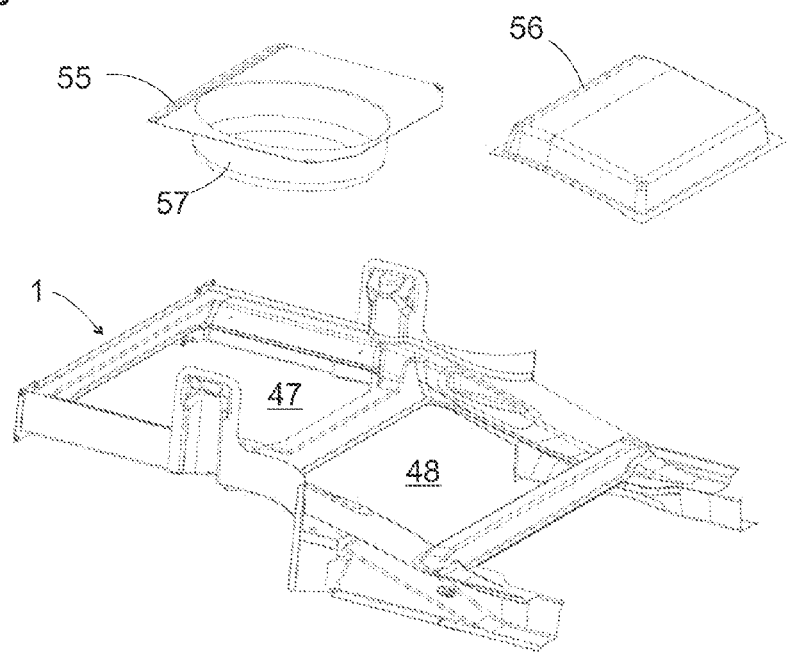
FIG. 12 is the ladder frame of FIG. 6 with a second set of floor panels.

FIG. 12 shows in turn in connection with the ladder frame 1, two alternative floor panels 55, 56. The rear floor panel 55 has a circular trough 57 which is provided in order to accommodate a spare wheel. The floor panel 56 by contrast is curved upwards in order to accommodate, underneath that, outside the passenger cell, space for accommodating a tank, in particular for compressed gas or the like, a battery for a vehicle with hybrid drive or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An underbody for a motor vehicle, the underbody having a ladder frame comprising:
    side members; and
    cross members, wherein the side members and the cross members bound at least one opening, and each of the side members and the cross members comprises an upper shell and a lower shell and wherein the upper shells are interconnected into an upper ladder and the lower shells into a lower ladder,
    wherein a first upper shell of at least one of the cross members comprises protruding straps on two ends, each of which is fastened to a top side of one of the side members, and a first lower shell of the at least one of the cross members comprises straps protruding on two ends, each of which is fastened to a lower side of the at least one of the side members, and
    wherein the upper and lower shells of each cross member adjoining the at least one opening and/or of each side member adjoining the at least one opening on their longitudinal margins have longitudinal flanges touching one another and fastened to one another.

2. The underbody according to claim 1, wherein at least one of the cross members on its ends acting on the side members has larger cross-sectional dimensions than in a central region.

3. The underbody according to claim 2, wherein an upper flank of the cross member is concavely curved.

4. The underbody according to claim 1, wherein on the two ends of the upper and/or lower shells of the at least one of the cross members, flanges are angled off and are fastened to flanks of the side members facing one another.

5. The underbody according to claim 1, wherein a floor panel fills out the at least one opening of the ladder frame.

6. The underbody according to claim 1, wherein the longitudinal flanges form a fastening area for a floor panel which projects into the at least one opening.

7. The underbody according to claim 1, wherein the longitudinal flanges form a frame extending round about the opening.

8. The underbody according to claim 1, wherein the longitudinal flanges are arranged at half a height of their side members or cross members.

9. The underbody according to claim 6, wherein the floor panel has a trough that is open towards a top.

10. The underbody according to claim 9, wherein the trough accommodates a spare wheel or a seat cushion.

11. The underbody according to claim 6, wherein the floor panel has a hollow space that is open towards a bottom for accommodating a tank.

* * * * *